April 4, 1961
R. R. RACINE
2,978,273
SAFETY VEHICLE SEAT SYSTEM
Filed April 22, 1959
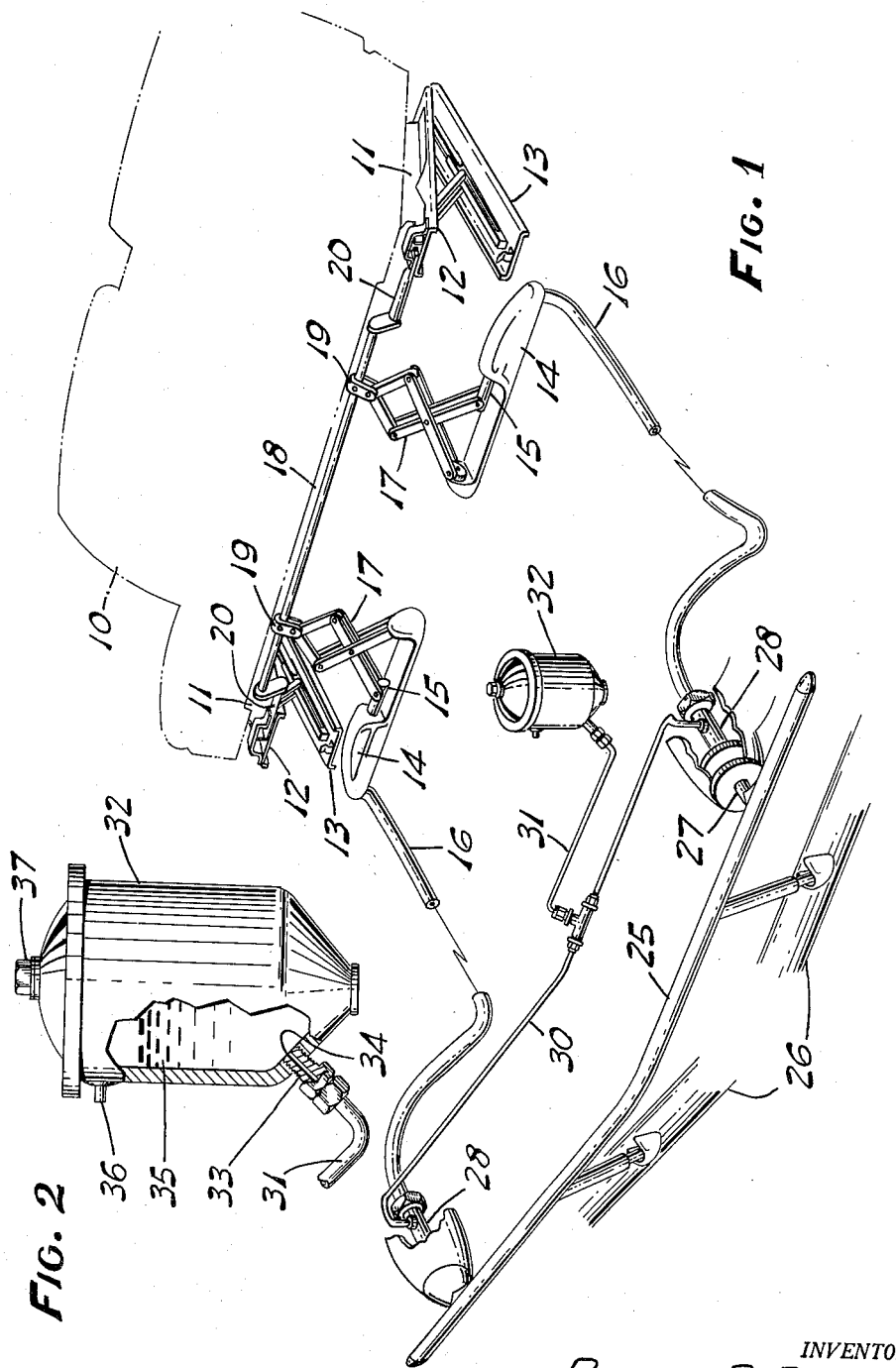
INVENTOR.
ROGER R. RACINE
BY
Bean Brooks, Buckley & Bean
ATTORNEYS.

United States Patent Office 2,978,273
Patented Apr. 4, 1961

2,978,273
SAFETY VEHICLE SEAT SYSTEM

Roger R. Racine, Tonawanda, N.Y., assignor to Protect-O-Matic Corporation, Tonawanda, N.Y.

Filed Apr. 22, 1959, Ser. No. 808,197

4 Claims. (Cl. 296—65)

This invention relates to automotive vehicles and particularly to automotive seat actuating mechanism which is adapted to protect occupants of the vehicle against injury upon collision or impact of the vehicle against another vehicle or a stationary object.

It is well known that personal injuries in the case of front end collisions of automotive vehicles are due mainly to the occupants being thrown forwardly against the windshield or other forward portions of the interior of the vehicle. Various expedients have been proposed to prevent this injurious forward movement of the occupants of a vehicle. The present invention relates to an apparatus wherein the passenger seat or seats are moved automatically to cradle the occupants thereof and thus overcome or nullify the normal tendency of passengers to be thrown forwardly off the seat and against injury-inflicting obstructions.

More particularly the present invention relates to hydraulic fluid pressure means operable upon impact or collision at the front of the vehicle to rock the vehicle seat rearwardly about a lower transverse pivotal connection before the passenger is thrown forwardly from the seat. This actuation of the vehicle seat is initiated, in the present apparatus, by an actuator disposed forwardly of the conventional vehicle bumper and adapted to come into contact with an obstruction even before the conventional vehicle bumper, and thus institute hydraulic fluid operating pressure for pivoting the seat. Arrangements of this general type are found in Krous Patent No. 2,789,650, dated April 23, 1957 and Racine Patent No. 2,883,206, dated April 21, 1959, and the present invention comprises an improvement therein.

It is vital and critical in the operation of a safety seat arrangement of this general class that the seat execute its pivotal movement within the shortest possible time, since only a split second is available between the first impact of collision and the time when a passenger will have moved too far forwardly to be safely retained in the seat by the rocking and scooping action of the mechanism of the present invention. Referring particularly to Racine Patent No. 2,883,206, a relatively large diameter direct-acting hydraulic column is established between the forwardly disposed actuator which generates the hydraulic fluid pressure and the remotely located seat operating hydraulic motors which raise the forward portion of the seat to pivot the same.

The present invention provides a modification of this arrangement which serves a multiplicity of purposes and in general comprises a hydraulic fluid containing reservoir connected with the aforesaid fluid column by a restricted orifice and adapted to contain, in addition to the hydraulic fluid, air under pressure which tends to urge the hydraulic fluid of the reservoir into the aforesaid operating fluid columns at a restricted rate of flow.

The aforesaid improvement is extremely simple and fool-proof in its operation and requires no check valves or other mechanical control devices for proper operation.

In general the purposes served by the pressured reservoir operating in conjunction with the hydraulic safety seat system are, among others, the following. First, the restricted orifice leading from the operating fluid columns to the reservoir permits relatively slow liquid flow from the columns to the reservoir when a force is applied to the forward actuating means which is not sufficiently abrupt to require rocking of the vehicle seat, such as when the vehicle is used to push another vehicle, or is brought against the bumper of another vehicle in a parking maneuver or the like. It would obviously be undesirable that the seat pivoting means operate under such conditions.

Because of the restricted communication between the operating liquid columns and the reservoir through the restricted orifice, the reservoir and its conduit are of no effect upon sudden impact against the forward actuating member and they do not in any way interfere with collision-engendered operation of the seat rocking mechanism.

A second purpose of the improvement of the present invention consists in the fact that the pressured liquid in the reservoir will flow back into the operating fluid columns to restore the forward actuating member to its proper forward position when pressure against such forward member is removed, particularly following a gradual force against the forward member such as in parking or the like.

A third purpose served by the reservoir of the present invention is that it maintains the operating fluid columns at full operating efficiency despite expansion and contraction due to changes in temperature and despite any possible minor leakage from the operating hydraulic system.

The following specification and the accompanying drawing set forth a representative practical embodiment of the principles of the present invention by way of example but it is to be understood that the scope of the present invention is not limited thereto or otherwise than as defined in the appended claims.

In the drawing:

Fig. 1 is a fragmentary perspective view showing an automotive vehicle seat and showing more or less schematically the safety seat mechanism in one form of the present invention; and Fig. 2 is an elevational view partly broken away of one form of a reservoir component which is employed in combination with the system and apparatus in practicing the present invention.

In the drawing like characters of reference denote like parts and, referring to Fig. 1, the numeral 10 indicates in dot and dash lines a conventional vehicle seat which is mounted at opposite sides upon a pair of conventional seat adjusters 11 of the kind normally employed in shifting the seat back and forth and in raising and lowering the same to adjust the seat to suit the operator of the vehicle. The conventional seat adjusters 11 are in turn mounted upon a pair of plate members 12 which are pivoted at their rear ends to permit the front end of the seat 10 to be moved pivotally upward and downward.

The plate members 12 are attached to pivot blocks (not shown) which are mounted for movement along base plate members 13 and the seat pivoting and sliding structure thus fragmentarily illustrated in Fig. 1 of the present application is disclosed more fully in a patent application Serial No. 808,198 which I am filing concurrently herewith wherein this portion of the apparatus comprises the subject matter of the invention of that application. For present purposes, it is sufficient to consider the seat 10 and the plates 11 as being pivoted at their rear portions for up and down pivotal movement.

The pivotal movement thus briefly described is attained by means of a pair of hydraulic cylinders 14 having piston rods 15 which are adapted to be projected toward each other from their respective cylinders 14 upon the application of hydraulic fluid pressure by way of conduits 16 in communication with the ends of cylinders 14. The projecting ends of the piston rods 15 connect with lazy tong linkages 17 the upper ends of which are attached to a tie rod 18 as at 19. In the present instance the tie rod 18 is offset downwardly at its opposite ends as at 20 and is fixed to the forward ends of the pivoted plate members 12.

Hydraulic fluid pressure for activating the cylinders 14 through the conduits 16 is developed by an operating bar 25 which is mounted at the front of the motor vehicle in a position somewhat forwardly of the conventional front bumper thereof which is indicated fragmentarily at 26. The operating bar 25 carries a pair of rearwardly extending piston rods 27 which engage in the front ends of cylinders 28 which are in effect mere forward extensions of the fluid conduits 16.

It will therefore be seen that impingement of an object or obstacle against operating bar 25 forcing the same rearwardly will move the piston rods 27 rearwardly in cylinders 28 and thus apply hydraulic operating pressure to the cylinders 14 to raise the front end of seat structure 10 through the cooperation of the lazy tong linkages 17.

This much of the apparatus of the present invention is shown generally in my prior patent application, Serial No. 677,855 filed August 13, 1957, which is now Patent No. 2,883,206 dated April 21, 1959.

According to the present invention a relatively small hydraulic conduit 30 connects between the principal fluid conduits 16 behind the portions of the cylinders 28 which receive the pistons 27 and a further conduit 31 communicates between the connecting conduit 30 and a fluid reservoir which is designated 32 in Fig. 1 and is shown in greater detail in Fig. 2.

The conduit 31 connects with reservoir 32 by means of a coupling 33 which contains a relatively constricted communication orifice 34. The interior of reservoir 32 contains a supply of hydraulic fluid 35 and super-atmospheric pressure is preferably maintained against the upper surface of hydraulic fluid 35 in reservoir 32. For this purpose, an ordinary pneumatic tire valve 36 may be fitted to reservoir 32 and pressure may be kept at a desired level by means of the usual service station air hose. In Fig. 2 the numeral 37 designates a filler cap for replenishing the hydraulic fluid supply when necessary.

It will be noted that, subject to the restriction of orifice 34, the hydraulic fluid in reservoir 32 is in free and open flow communication with the hydraulic fluid in the operating conduits 16 by way of the conduits 30 and 31. When an abrupt impact forces the pistons 27 into the cylinders 28 to operate the seat raising pivot mechanism, the presence of the reservoir does not affect, alter or impede the operation, since the orifice 34 is sufficiently attenuated so that no substantial pressure flow therethrough can take place during the relatively brief fraction of a second of such seat raising operation.

However, if pressure against the operating bar 25 is relatively slight and not due to impact, as when the operating bar 25 meets an obstruction at very low speed such as in parking or in merely pushing another vehicle, fluid from the cylinders 28 and conduits 16 may exhaust into reservoir 32 through orifice 34, so as not to force operation of the seat raising mechanism under such non-emergency conditions. Such fluid flow to the pneumatic reservoir merely builds up the pressure therein. Upon removal of such non-emergency pressures or forces from operating rod 25, the pressure within reservoir 32 will force hydraulic fluid back into the operating conduits 16 to restore the operating rod 25 to its desired initial forward position.

Furthermore, hydraulic fluid may flow freely through the orifice 34 upon expansion and contraction of the fluid in the operating conduit 16 due to thermal changes to maintain the operating system filled, and in the event of leakage of hydraulic fluid from the operating system the pressured fluid in reservoir 32 will replenish the leakage loss and likewise maintain the hydraulic operating system filled with hydraulic fluid.

I claim:

1. In an automotive vehicle, a passenger seat, means mounting said seat for movement about an axis adjacent to the lower rear portion of said seat, hydraulic fluid cylinder means and a piston movable therein to raise the front portion of said seat about said axis, hydraulic fluid cylinder means mounted at a forward portion of said vehicle, actuating means projecting forwardly of said vehicle and movable relatively rearwardly upon impact with an obstruction, a piston movable in said forward mounted cylinder means and a connection between said piston and said actuating means, an operating conduit between said two cylinder means of a size comparable to the cross sectional area as said cylinders to provide a continuous hydraulic fluid column of substantially constant cross sectional area extending from the face of the actuating means operated piston to the face of the seat raising piston, a fluid reservoir and conduit means from the interior thereof to said operating conduit, said fluid reservoir conduit establishing open continuous communication between the interior of the reservoir and said operating conduit and including therein an orifice of relatively small cross sectional area whereby sudden impact fluid pressure in said operating conduit is not affected by said reservoir conduit, and means for maintaining super-atmospheric pressure against the fluid in said reservoir.

2. In an automotive vehicle, a passenger seat, means mounting said seat for movement about an axis adjacent to the lower rear portion of said seat, hydraulic fluid cylinder means and a piston movable therein to raise the front portion of said seat about said axis, hydraulic fluid cylinder means mounted at a forward portion of said vehicle, actuating means projecting forwardly of said vehicle and movable relatively rearwardly upon impact with an obstruction, a piston movable in said forward mounted cylinder means and a connection between said piston and said actuating means, an operating conduit between said two cylinder means to provide a continuous hydraulic fluid column extending from the actuating means operated piston to the seat raising piston, a fluid reservoir and conduit means from the interior thereof to said operating conduit, said fluid reservoir conduit establishing open continuous communication between the interior of the reservoir and said operating conduit and including therein a relatively small orifice whereby sudden impact fluid pressures in said operating conduit are transmitted therethrough without appreciable diversion to said reservoir conduit, and means for maintaining super-atmospheric pressure against the fluid in said reservoir.

3. In an automotive vehicle, a passenger seat, means mounting said seat for movement about an axis adjacent to the lower rear portion of said seat, hydraulic fluid motor means for raising the front portion of said seat about said axis, hydraulic fluid pressure generating means mounted at a forward portion of said vehicle, actuating means projecting forwardly of said vehicle and movable relatively rearwardly upon impact with an obstruction to actuate said pressure generating means, an operating conduit between said pressure generating means and said motor means, a fluid reservoir and conduit means from the interior thereof to said operating conduit, said fluid reservoir conduit establishing open continuous communication between the interior of the reservoir and said operating conduit and including therein a relatively small orifice whereby sudden impact fluid pressures in said operating conduit are transmitted therethrough without appreciable diversion to said reservoir conduit, and means for maintaining superatmospheric pressure against the fluid in said reservoir.

4. In an automotive vehicle, a passenger seat, means mounting said seat for movement about an axis adjacent to the lower rear portion of said seat, hydraulic fluid motor means for raising the front portion of said seat about said axis, hydraulic fluid pressure generating means mounted at a forward portion of said vehicle, actuating means projecting forwardly of said vehicle and movable relatively rearwardly upon impact with an obstruction to actuate said pressure generating means, an operating conduit between said pressure generating means and said motor means to provide a continuous hydraulic fluid column extending from said pressure generating means to said motor means, a fluid reservoir and conduit means from the interior thereof to said operating conduit, said fluid reservoir conduit establishing open continuous communication between the interior of the reservoir and said operating conduit and including therein a relatively small orifice whereby sudden impact fluid pressure in said operating conduit is transmitted therethrough without appreciable diversion to said reservoir conduit, and means for maintaining super-atmospheric pressure against the fluid in said reservoir.

References Cited in the file of this patent

UNITED STATES PATENTS

| | | |
|---|---|---|
| 2,789,650 | Krous | Apr. 23, 1957 |
| 2,883,206 | Racine | Apr. 21, 1959 |